(12) United States Patent
Seidemann et al.

(10) Patent No.: US 7,736,598 B2
(45) Date of Patent: Jun. 15, 2010

(54) REACTOR AND METHOD FOR PRODUCING CHLORINE FROM HCL

(75) Inventors: Lothar Seidemann, Mannheim (DE); Olga Schubert, Ludwigshafen (DE); Martin Sesing, Waldsee (DE); Eckhard Stroefer, Mannheim (DE); Martin Fiene, Niederkirchen (DE); Christian Walsdorff, Ludwigshafen (DE); Klaus Harth, Tai Tam (HK)

(73) Assignee: BASF Aktiengesellschaft, Ludwigshafen (DE)

( * ) Notice: Subject to any disclaimer, the term of this patent is extended or adjusted under 35 U.S.C. 154(b) by 850 days.

(21) Appl. No.: 10/588,511

(22) PCT Filed: Feb. 8, 2005

(86) PCT No.: PCT/EP2005/001249

§ 371 (c)(1),
(2), (4) Date: Aug. 4, 2006

(87) PCT Pub. No.: WO2005/077520

PCT Pub. Date: Aug. 25, 2005

(65) Prior Publication Data

US 2007/0183963 A1 Aug. 9, 2007

(30) Foreign Application Priority Data

Feb. 11, 2004 (DE) .................. 10 2004 006 610

(51) Int. Cl.
*F27B 15/14* (2006.01)
*F27B 15/00* (2006.01)
*C01B 7/00* (2006.01)

(52) U.S. Cl. .......... 422/146; 422/143; 423/502
(58) Field of Classification Search .......... 422/143, 422/146; 423/502
See application file for complete search history.

(56) References Cited

U.S. PATENT DOCUMENTS

| | | | | |
|---|---|---|---|---|
| 2,852,545 A | * | 9/1958 | Jenny | 518/712 |
| 2,893,851 A | * | 7/1959 | Georgian | 422/139 |
| 3,708,887 A | * | 1/1973 | Erisman | 34/585 |
| 4,197,418 A | | 4/1980 | Lee et al. | |
| 4,499,944 A | | 2/1985 | Komakine | |
| 5,112,593 A | * | 5/1992 | Itoh et al. | 423/502 |
| 5,876,679 A | | 3/1999 | D'Acierno et al. | |
| 5,908,607 A | * | 6/1999 | Abekawa et al. | 423/502 |

FOREIGN PATENT DOCUMENTS

| | | |
|---|---|---|
| DE | 1571 39 | 10/1982 |
| DE | 197 34 412 | 2/1998 |
| DE | 197 48 299 | 5/1998 |
| EP | 0 329 494 A1 | 8/1989 |
| EP | 0 331 465 | 9/1989 |
| GB | 1 382 991 | 2/1975 |

(Continued)

*Primary Examiner*—Walter D Griffin
*Assistant Examiner*—Lessanework Seifu
(74) *Attorney, Agent, or Firm*—Oblon, Spivak, McClelland, Maier & Neustadt, L.L.P.

(57) ABSTRACT

The invention relates to a reactor and a process for preparing chlorine from hydrogen chloride by gas-phase oxidation by means of oxygen in the presence of a heterogeneous catalyst in a fluidized bed, with gas-permeable plates being located in the fluidized bed. The gas-permeable plates are connected in a thermally conductive manner to a heat exchanger located in the fluidized bed.

18 Claims, 3 Drawing Sheets

FOREIGN PATENT DOCUMENTS

Figure 1:
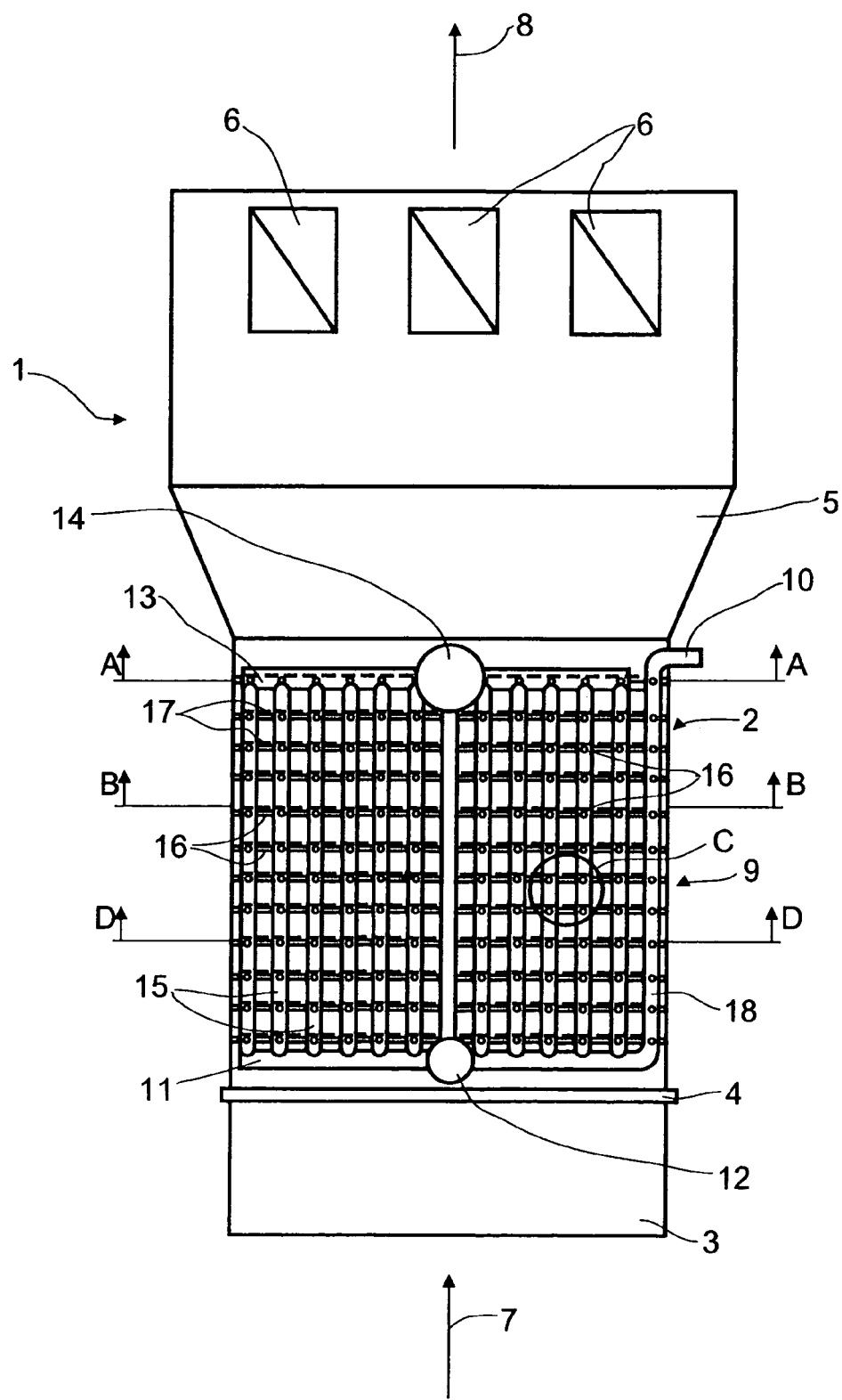

| | | |
|---|---|---|
| JP | 54-29996 | 9/1979 |
| JP | 58-142192 | 8/1983 |
| JP | 1-180236 | 7/1989 |
| JP | 11-009985 | 1/1999 |
| JP | 2000-320821 | 11/2000 |
| JP | 2004-020357 | 1/2004 |

* cited by examiner

REACTOR AND METHOD FOR PRODUCING CHLORINE FROM HCL

The invention relates to a reactor for preparing chlorine from hydrogen chloride by gas-phase oxidation by means of oxygen in the presence of a heterogeneous catalyst in a fluidized bed. The invention further relates to a process for preparing chlorine using the reactor.

The process developed by Deacon in 1868 for the catalytic oxidation of hydrogen chloride by means of oxygen in an exothermic equilibrium reaction is the start of industrial chlorine chemistry. Chloralkali electrolysis has pushed the Deacon process far into the background, and virtually all chlorine produced is obtained by electrolysis of aqueous sodium chloride solutions.

However, the attractiveness of the Deacon process has recently been increasing again, since the worldwide demand for chlorine is growing more strongly than the demand for sodium hydroxide. This development makes the process for preparing chlorine by oxidation of hydrogen chloride, which is decoupled from sodium hydroxide production, attractive. In addition, hydrogen chloride is obtained in large amounts as coproduct in, for example, phosgenation reactions, for instance in isocyanate production. The hydrogen chloride formed in isocyanate production is predominantly used in the oxychlorination of ethylene to 1,2-dichloroethane which is processed to give vinyl chloride and further to PVC. Examples of further processes in which hydrogen chloride is obtained are the preparation of vinyl chloride, polycarbonate production and the recycling of PVC.

The oxidation of hydrogen chloride to chlorine is an equilibrium reaction. The position of the equilibrium shifts away from the desired end product as the temperature increases. It is therefore advantageous to use catalysts which have a very high activity and allow the reaction to proceed at relatively low temperatures. Such catalysts are, in particular, catalysts based on copper or catalysts based on ruthenium, for example the supported catalysts described in DE-A 197 48 299 comprising the active composition ruthenium oxide or ruthenium mixed oxide, with the ruthenium oxide content being from 0.1 to 20% by weight and the mean particle diameter of ruthenium oxide being from 1.0 to 10.0 nm. Further supported catalysts based on ruthenium are known from DE-A 197 34 412: ruthenium chloride catalysts comprising at least one of the compounds titanium oxide and zirconium oxide, ruthenium-carbonyl complexes, ruthenium salts of inorganic acids, ruthenium-nitrosyl complexes, ruthenium-amine complexes, ruthenium complexes of organic amines or ruthenium-acetylacetonate complexes. In addition to ruthenium, gold can also be present in the active composition of the catalyst.

In gas-phase reactions which are carried out in the presence of a solid catalyst, good mixing and thus a uniform distribution of gas and solid can be achieved by the use of fluidized-bed reactors. To avoid agglomeration of gas bubbles and thus a deterioration in the mixing of gas and solid, EP-A 0 331 465 discloses a fluidized-bed reactor in which perforated plates are installed at equal intervals in the fluidized bed. The agglomerated gas bubbles disintegrate as they flow through the perforated plates. This leads to improved mixing of the gas with the solid.

In EP-A 0331 465, a chromium oxide is used as catalyst. In contrast to this, catalysts based on ruthenium are temperature-sensitive. At temperatures above 400° C., volatile ruthenium compounds are formed. To avoid a loss of active composition, it is therefore necessary to operate the process for preparing chlorine from hydrogen chloride in the presence of ruthenium-based catalysts as isothermally as possible at temperatures below 400° C.

It is therefore an object of the invention to provide a reactor for preparing chlorine from hydrogen chloride by gas-phase oxidation by means of oxygen, which allows good mixing of gas and solid phase and operates largely isothermally.

This object is achieved by a reactor for preparing chlorine from hydrogen chloride by gas-phase oxidation by means of oxygen in the presence of a heterogeneous catalyst in a fluidized bed, with a heat exchanger and gas-permeable plates being accommodated in the fluidized bed. The gas-permeable plates are connected to the heat exchanger in a thermally conductive manner.

The thermally conductive connection between the gas-permeable plates and the heat exchanger increases the heat transfer area in the fluidized bed, since the gas-permeable plates act as ribs which take up heat and conduct it to the heat exchanger. To achieve this, it is necessary for the thermal conductivity of the gas-permeable plates to be greater than the thermal conductivity in the fluidized bed.

The thermally conductive connection between the gas-permeable plates and the heat exchanger can be positive, frictional or integral. Positive connections are, for example, connections involving bolts, pins or rivets. Frictional connections are, for example, screw connections, clamped fittings or connections having springy links. Integral connections include welding, soldering and adhesive bonding.

Preference is given to integral connections since these achieve the best heat transfer from the gas-permeable plates to the heat exchanger.

An isothermal fluidized bed is preferably obtained by providing a very large heat transfer area. Suitable heat exchangers are, for example, shell-and-tube heat exchangers having tubes arranged horizontally or vertically in the fluidized bed or plates which are arranged vertically in the fluidized bed and through which a heat transfer medium flows. The heat exchanger tubes or heat exchanger plates are preferably arranged within the fluidized bed in such a way that fluidization of the fluidized bed is not adversely affected by installation of the heat exchanger.

When using plates through which a heat transfer medium flows, these are preferably connected to one another by the gas-permeable plates, with the gas-permeable plates preferably being arranged perpendicular to the heat exchanger plates.

In a preferred embodiment using shell-and-tube heat exchangers, the individual heat exchanger tubes arranged vertically in the fluidized bed are connected to one another by horizontal tubes. The gas-permeable plates then preferably rest on the horizontal tubes. In a further embodiment, the horizontal tubes can also be integrated into the gas-permeable plates. Here, the areas bounded by the horizontal tubes are closed by the gas-permeable plates.

The heat transfer medium should be selected so that it is chemically and thermally stable at the temperatures occurring in the heat exchanger. Thus, suitable heat transfer media are, for example, salt melts or preferably liquids which vaporize at the reaction temperature in the range up to 400° C. A particularly preferred heat transfer medium is water at a pressure of from 10 to 60 bar. The advantage of vaporizing liquids as heat transfer media is that their temperatures does not alter during vaporization of the heat transfer medium. Isothermal conditions can in this way be established in the heat exchanger.

Materials of construction used for the heat exchangers are preferably steel or nickel alloys. The use of nickel alloys is preferred when condensation of hydrochloric acid cannot be ruled out. Thus, water at a pressure of, for example, 25 bar condenses at a temperature of about 224° C. When liquid water occurs, hydrogen chloride dissolves in it to form hydrochloric acid.

The installation of the gas-permeable plates in the fluidized bed influences the bubble and solids motion in a targeted way and thus optimizes the residence time of the gas in the reactor. The gas-permeable plates serve, in particular, to tear apart agglomerated gas bubbles and thus ensure that relatively small gas bubbles are distributed uniformly in the fluidized solid. As gas-permeable plates, preference is given to using perforated plates or mesh-type structures. The size of the individual openings in the gas-permeable plates is preferably in the range from 1 to 100 000 $mm^2$, more preferably in the range from 5 to 10 000 $mm^2$, in particular in the range from 10 to 1000 $mm^2$.

In a further embodiment, the gas-permeable plates are configured as ordered or unordered mesh structures. Ordered mesh structures are, for example, screen or lattice structures, and unordered mesh structures are, for example, knits or braids.

The size of the openings or the structure of the gas-permeable plates is chosen so that coalescence of bubbles is avoided. Contrary to the relationship generally known to those skilled in the art which states that disturbance of solids motion caused by internals leads to a deterioration in the heat transfer efficiency in the fluidized bed, it has been found that the avoidance of bubble coalescence, which leads to smaller gas bubbles in the fluidized bed, improves heat transport within the fluidized bed to such an extent that it outweighs the deterioration due to the internals and thus produces an overall improvement in the heat transport in the fluidized bed. Owing to the smaller gas bubbles, the fluidized bed is mixed more effectively, which leads to a uniform temperature distribution. In addition, the heat transport within the fluidized bed is not hindered by large gas bubbles which have an insulating effect. This additionally leads to improved heat transport to the heat exchanger and thus to better heat removal from the fluidized bed. For this reason, the heat exchanger can be made smaller, which leads to material savings and thus cost savings.

The gas-permeable plates preferably have a spacing of from 5 to 200 cm, more preferably from 10 cm to 100 cm and particularly preferably from 20 to 50 cm.

Like the heat exchanger, the gas-permeable plates are preferably made of steel or nickel alloys. Here too, nickel alloys are used when condensation of hydrochloric acid cannot be ruled out.

The fluidized bed is preferably separated from the surroundings by a reactor wall. The reactor wall is preferably gastight and thermally insulated against the surroundings. In this way, for example, gases participating in the reaction are prevented from escaping through the reactor wall to the surroundings. Thermal insulation of the reactor wall prevents the reaction temperature from dropping in the marginal region of the fluidized bed. In this way, it is ensured that the reaction occurs uniformly over the entire region of the fluidized bed. Insulation of the reactor wall also reduces the necessary safety precautions, since there are no hot surfaces on the outside of the reactor which could lead to burns when touched.

The reactor wall is preferably cylindrical, but can also have any other cross section. The thickness of the reactor wall is preferably such that thermal stresses over the circumference and the height of the reactor wall are avoided. At the same time, mechanical stability of the reactor wall has to be ensured.

Materials suitable for the reactor wall are any metallic materials for which by-product formation in the reactor can be ruled out and which ensure mechanical stability. The reactor wall is preferably made of steel or nickel alloys. Furthermore, the reactor wall can be lined with nickel or nickel alloys. Nickel alloys are used particularly when condensation of hydrochloric acid in the reactor cannot be ruled out.

The feed gases hydrogen chloride and oxygen are preferably fed in via a windbox located beneath the fluidized bed. It is possible for a gas stream comprising hydrogen chloride and an oxygen-containing gas stream to be fed separately into the windbox and mixed in the windbox. However, mixing preferably occurs upstream of the windbox, so that a gas stream comprising hydrogen chloride and oxygen is fed in.

The gas can be fed into the windbox at the underside of the windbox, at the side or tangentially. In the case of tangential introduction of gas, a whirling motion is produced within the windbox. When the gas is fed in from the bottom, it is preferably fed in centrally. The windbox can be of any shape known to those skilled in the art. When a fluidized-bed reactor having a circular cross section is used, the windbox is preferably round-domed, conical or cylindrical.

Suitable materials for the windbox are all metallic materials for which by-product formation can be ruled out and mechanical stability is ensured. However, apart from metallic materials, the windbox can also be made of ceramic materials.

In a preferred embodiment, the feed gas stream is introduced centrally from below into the windbox. The windbox is in this case round-domed and configured so that sudden cross-sectional widenings are avoided. Avoidance of edges within the windbox suppresses turbulence which could lead to erosion on the interior wall of the windbox.

To improve uniform distribution of the gas stream in the windbox and to ensure that the gas flows uniformly into the fluidized bed, an impingement device against which the inflowing gas flows is, in a preferred embodiment, located in the windbox. The deflection of the gas stream forced by the impingement device leads to dissipation of the momentum of the inflowing feed gas. The impingement device is preferably a simple plate, in the form of a funnel or in the form of a round dome. Like all other surfaces which can come into contact with the reaction gases, the impingement plate preferably consists of steel or nickel alloys. Nickel alloys are used when condensation of hydrochloric acid cannot be ruled out.

The windbox is adjoined by a gas distributor via which the gas stream is introduced into the fluidized bed. The gas distributor is preferably designed so that uniform gas distribution over the cross section is ensured.

Suitable gas distributors are, for example, perforated plates or gas distributor nozzles distributed over a plate.

When a windbox is used for introduction of gas into the fluidized bed, the gas distributor is preferably the boundary between the windbox and the fluidized bed.

Apart from the introduction of the gas via the windbox, the gas can also be fed directly into the fluidized bed without use of a windbox. For this purpose, the gas distributor is preferably configured as a pipe system through which the gas flows into the fluidized bed.

The catalytic oxidation of hydrogen chloride is preferably carried out isothermally or approximately isothermally in the fluidized bed at reactor temperatures of from 180 to 500° C., preferably from 200 to 450° C., particularly preferably from 300 to 400° C., and a pressure of from 1 to 25 bar, preferably from 1.2 to 20 bar, particularly preferably from 1.5 to 17 bar and in particular from 2.0 to 15 bar.

Catalysts which can be used for the process of the invention are in principle all known catalysts for the oxidation of hydrogen chloride to chlorine, for example the above-described ruthenium-based catalysts known from DE-A 197 48 299 or DE-A 197 34 412. Also suitable are the gold-based catalysts described in DE-A 102 44 996, which comprise from 0.001 to 30% by weight of gold, from 0 to 3% by weight of one or more alkaline earth metals, from 0 to 3% by weight of one or more alkali metals, from 0 to 10% by weight of one or more rare earth metals and from 0 to 10% by weight of one or more further metals selected from the group consisting of ruthenium, palladium, osmium, iridium, silver, copper and rhenium, on a support, in each case based on the total weight of the catalyst.

In a particularly preferred embodiment, the granular material used to form the fluidized bed comprises the heterogeneous catalyst. Here, the individual grains of the granular material of the fluidized bed form the catalyst supports which are impregnated with active composition. Suitable support materials are, for example, silicon dioxide, graphite, titanium dioxide having the rutile or anatase structure, zirconium dioxide, aluminum oxide or mixtures thereof, preferably titanium dioxide, zirconium dioxide, aluminum oxide or mixtures thereof, particularly preferably γ- or δ-aluminum oxide or mixtures thereof.

The supported copper or ruthenium catalysts can, for example, be obtained by impregnating the support material with aqueous solutions of $CuCl_2$ or $RuCl_3$ and, if appropriate, a promotor for doping, preferably in the form of its chlorides. Shaping of the catalyst can be carried out after or preferably before impregnation of the support material.

Promotors suitable for doping are alkali metals such as lithium, sodium, potassium, rubidium and cesium, preferably lithium, sodium and potassium, particularly preferably potassium, alkaline earth metals such as magnesium, calcium, strontium and barium, preferably magnesium and calcium, particularly preferably magnesium, rare earth metals such as scandium, yttrium, lanthanum, cerium, praseodymium and neodymium, preferably scandium, yttrium, lanthanum and cerium, particularly preferably lanthanum and cerium, or mixtures thereof.

The grains of the granular material can subsequently be dried and if appropriate calcined at temperatures of from 100 to 400° C., preferably from 100 to 300° C., for example under a nitrogen, argon or air atmosphere. The grains of the granular material are preferably firstly dried at from 100 to 150° C. and subsequently calcined at from 200 to 400° C.

Apart from the granular material impregnated with active composition in the fluidized bed, grains of inert granular material can also be additionally present in the fluidized bed. Inert materials which can be used are, for example, titanium dioxide, zirconium dioxide or mixtures thereof, aluminum oxide, steatite, ceramic, glass, graphite and stainless steel. The grains of inert granular material preferably have similar external dimensions to the grains of granular material impregnated with active composition.

Above the fluidized bed there is a disengagement zone in which the fluidized granular material of the fluidized bed separates from the gas phase. To take off the gas from the fluidized-bed reactor with as little solid as possible, solids precipitators which increase the degree of precipitation of solids are used in the disengagement zone in a preferred embodiment.

The solids precipitators are preferably arranged at a height above the discharge height for the grains of granular material which are flung up from the fluidized bed as the gas bubbles leave it. The required precipitation performance of these solids precipitators is thus minimized by means of an appropriate distance between the fluidized bed and the solids precipitators.

Suitable solids precipitators are, for example, cyclones and candle filters.

To reduce the superficial gas velocity in the disengagement zone, this region is widened conically. In this way, the required precipitation performance of the solids precipitators can be reduced further.

As material for the disengagement zone and the one or more solids precipitator(s), preference is given to using metallic materials for which by-product formation can be ruled out and which ensure the necessary mechanical stability. Particularly preferred materials for solids precipitators and disengagement zone are steel and nickel alloys. Suitable nickel alloys are, for example, Hasteloy materials or Inconell. These are used when condensation of hydrochloric acid cannot be ruled out.

When candle filters are used for precipitating the solids, it is possible to use not only suitable metal materials but also ceramic materials.

The invention is described in more detail below with the aid of a drawing.

Figure 2:
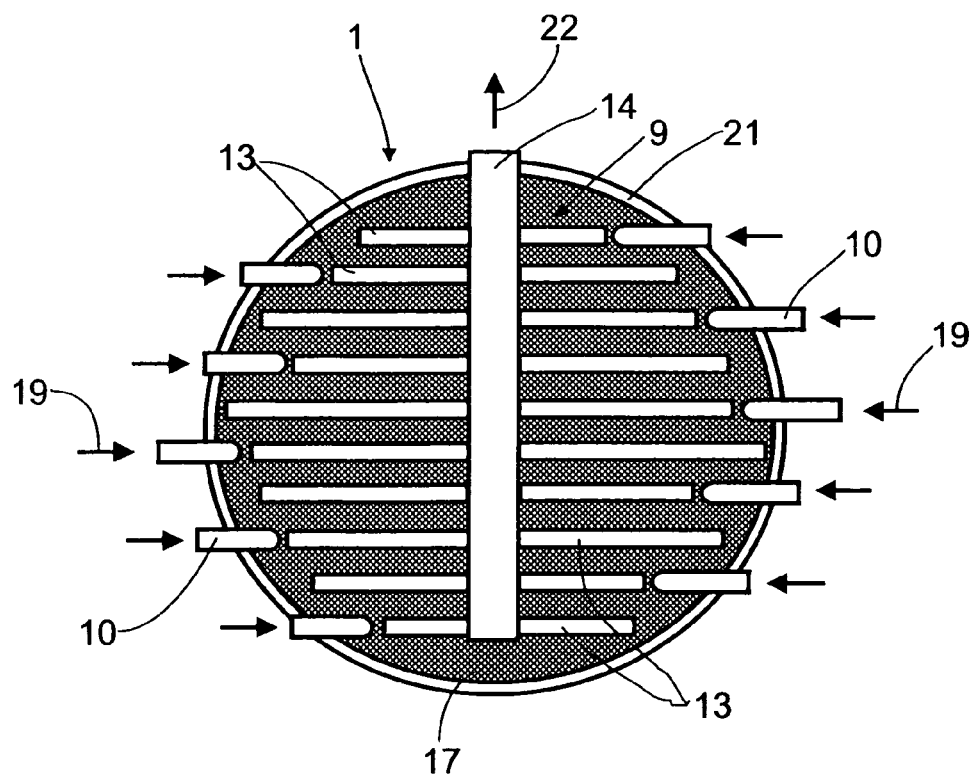
Figure 3:
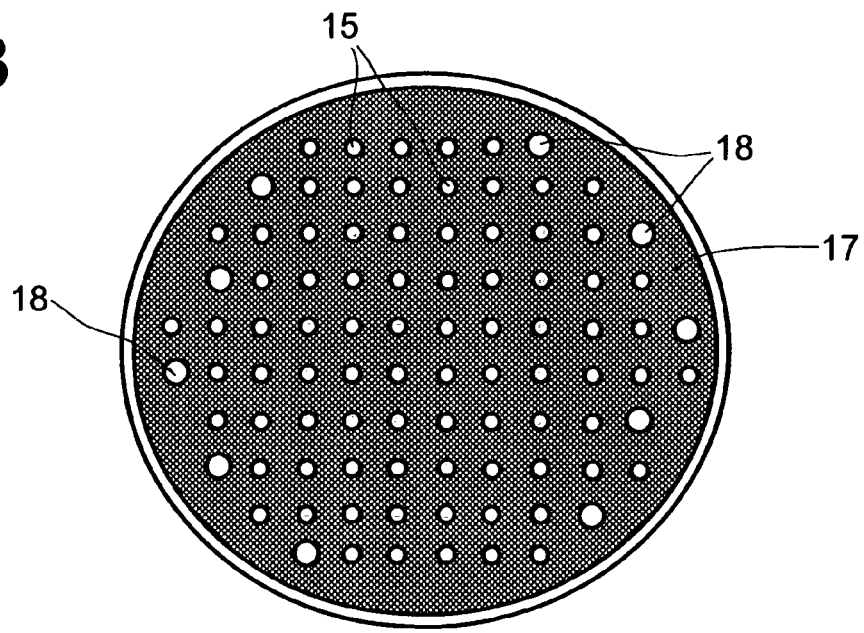
Figure 4:
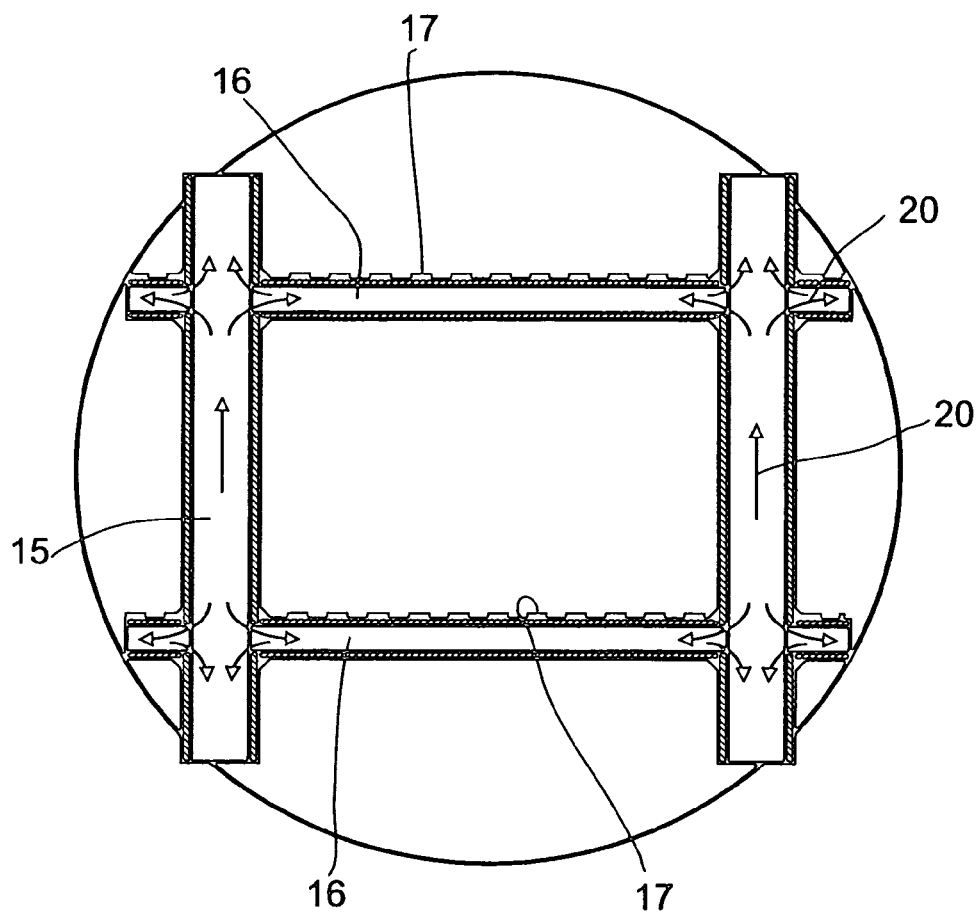
Figure 5:
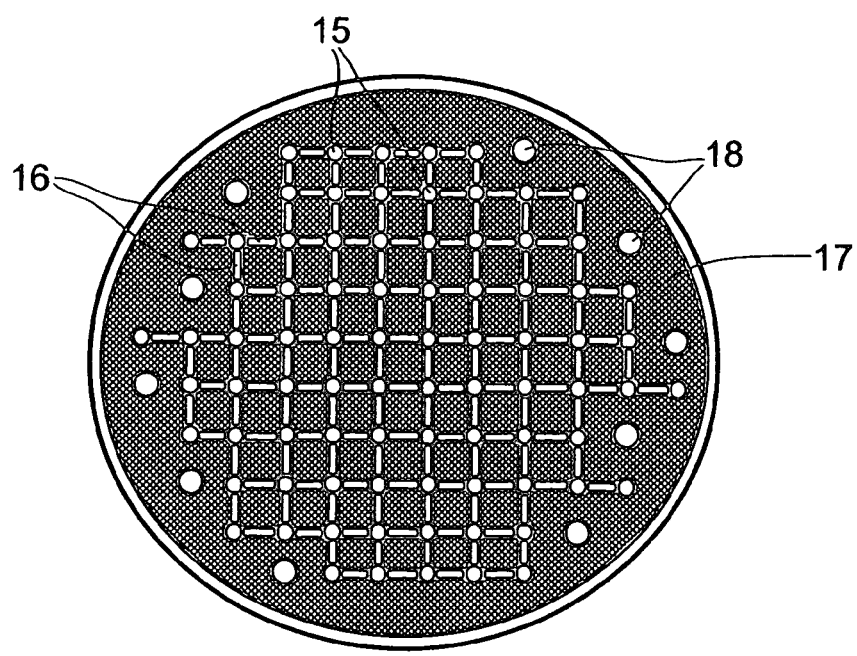

In the drawing:

FIG. 1 shows a section through a fluidized-bed reactor configured according to the invention, FIG. 2 shows a section along the line AA in FIG. 1, FIG. 3 shows a section along the line BB in FIG. 1, FIG. 4 shows the detail C from FIG. 1, FIG. 5 shows a section along the line DD in FIG. 1.

FIG. 1 schematically shows a section through a fluidized-bed reactor configured according to the invention.

A reactor 1 comprises a fluidized bed 2, a windbox 3, a gas distributor 4, a disengagement zone 5 and at least one solids precipitator 6. The feed gases are fed into the windbox 3. The introduction of gas is indicated here by the arrow 7. The introduction of gas into the windbox 3 can be carried out from below as shown here or else from the side. The gas stream comprising hydrogen chloride and the oxygen-containing gas stream can be mixed upstream of the windbox 3 or else can be fed separately into the windbox 3. When they are fed in separately, mixing then occurs in the windbox 3. From the windbox 3, the gas flows via the gas distributor 4 into the fluidized bed 2. The task of the gas distributor 4 is to ensure that the gas flows uniformly into the fluidized bed 2 and good mixing of gas and solid in the fluidized bed 2 is thus achieved. The gas distributor 4 can be a perforated plate or a plate having gas distributor nozzles distributed over it.

In the fluidized bed 2, the hydrogen chloride and oxygen react to form chlorine and water. This reaction liberates heat which is removed via a heat exchanger 9. This ensures that the reaction occurs under isothermal or almost isothermal conditions.

A heat transfer medium is fed into the heat exchanger 9 via at least one heat transfer medium inlet 10. The heat transfer medium flows via at least one heat transfer medium feed pipe 18 into at least one heat transfer medium distributor 11. In the case of the heat exchanger 9 shown here, the heat transfer medium inlet 10 is located in the upper region of the fluidized bed 2. However, the heat transfer medium inlet 10 can also be located at any other height of the fluidized bed 2.

Heat exchanger tubes 15 positioned vertically in the fluidized bed branch off from the heat transfer medium distributor or distributors 11. To increase the heat transfer area, the heat exchanger tubes 15 are connected by transverse tubes 16. The heat transfer medium likewise flows through the transverse tubes 16. When a heat transfer medium which vaporizes due to uptake of the heat liberated in the reaction is used, the transverse tubes 16 are preferably inclined slightly from the horizontal so that vapor plugs which block the transverse tube 16 cannot be formed in the transverse tubes 16. The angle at which the transverse tubes 16 are inclined from the horizontal is preferably <10°, more preferably <5° and particularly preferably <2°.

When heat exchangers 9 in which the number of heat transfer medium inlets 10 is not the same as the number of heat transfer medium distributors 11 are used, the heat transfer medium distributors 11 are preferably connected to one another by a liquid collector 12 via which the heat transfer medium is distributed into the heat transfer medium distributors 11.

At the end opposite the heat transfer medium distributor 11, the heat exchanger tubes 15 open into at least one vapor collector 13. If the heat exchanger 9 has a plurality of vapor collectors 13, these are preferably connected to a vapor offtake 14. The vaporized heat transfer medium is taken off from the heat exchanger 9 via the vapor offtake 14. The heat transfer medium is then preferably passed to a further heat exchanger in which it condenses out again and can thus be fed back in liquid form to the heat exchanger 9. A closed heat transfer medium circuit can be achieved in this way.

To increase the heat transfer area further and to achieve a uniform distribution of gas bubbles in the fluidized bed, gas-permeable plates 17 are accommodated in the fluidized bed transverse to the flow direction of the gas. The gas-permeable plates 17 are connected to the heat exchanger tubes 15 in a thermally conductive manner. The connection is preferably an integral, welded connection. In a preferred embodiment, the gas-permeable plates 17 are connected integrally to the transverse tubes 16, for example by welding. The gas-permeable plates 17 are preferably configured as perforated plates or as ordered or unordered mesh structures.

The fluidized bed 2 is adjoined by the disengagement zone 5. In a preferred embodiment, the cross section of the disengagement zone 5 increases in the flow direction of the gas. The disengagement zone 5 describes the region in which the granular material of the fluidized bed separates from the gas. To separate out grains of granular material which are entrained by the gas stream, at least one solids precipitator 6 is preferably located in the upper region of the disengagement zone 5. Apart from the embodiment shown in FIG. 1, in which the solids precipitator or precipitators 6 is/are located within the reactor 1, the solids precipitator or precipitators 6 can also be located outside the reactor 1. The arrow 8 indicates the product discharge following the solids precipitator or precipitators 6.

FIG. 2 shows a plan view of a section along the line AA in FIG. 1. In the embodiment shown here, the reactor 1 is bounded by a reactor wall 21 having a circular cross section. The reactor wall 21 is preferably insulated so that the heat flow through the reactor wall 21 is small. This at the same time helps operational safety, since it prevents the outside of the reactor wall 21 becoming too hot and thus being able to lead to burns when touched. The heat evolved in the reaction is removed via the heat exchanger 9. The heat transfer medium is introduced in the direction of the arrows 19 via the heat transfer medium inlets 10. The heat transfer medium flows via the heat transfer medium feed pipes 18 shown in FIG. 3 into the heat transfer medium distributors 11. In the heat exchanger tubes 15 which are likewise shown in FIG. 3, the heat transfer medium flows in the direction of the vapor collectors 13 shown in FIG. 2. As a result of the uptake of heat, the heat transfer medium vaporizes in the heat exchanger tubes 15. The vaporized heat transfer medium is collected in the vapor collectors 13 and fed into the vapor offtake 14. From the vapor offtake 14, the gaseous heat transfer medium is taken off from the heat exchanger 9. This is indicated by the arrow numbered 22.

To prevent gas bubbles from agglomerating within the fluidized bed 2 and to achieve uniform mixing of the fluidized bed 2, gas-permeable plates 17 configured as screens are shown in FIGS. 2 and 3.

FIG. 4 shows the detail labeled C in FIG. 1. The vertical heat exchanger tubes 15 are preferably joined to one another at regular intervals by the transverse tubes 16. Here, the spacings preferably correspond to the spacings between the gas-permeable plates 17. The transverse tubes 16 are preferably joined to the heat exchanger tubes 15 in an integral fashion. However, the connection can also be frictional, for example by means of pipe clips or any other pipe connections known to those skilled in the art. The gas-permeable plates 17 are preferably connected to the transverse tubes 16 in a thermally conductive manner. For this purpose, the gas-permeable plates 17 can, as shown here, be located above the transverse tubes 16, but it is also possible to conceive of an arrangement in which the gas-permeable plates 17 are located beneath the transverse tubes 16 or the transverse tubes 16 are located in the plane of the gas-permeable plates 17.

The heat transfer medium preferably flows from the vertical heat exchanger tubes 15 into the transverse tubes 16. To prevent vapor plugs being formed in the transverse tubes 16 on vaporization of the heat transfer medium and blocking the transverse tubes 16, the transverse tubes 16 are preferably inclined slightly.

FIG. 5 shows a section along the line DD in FIG. 1.

It can be seen from FIG. 5 that the heat transfer medium feed pipes 18 are not connected to the heat exchanger tubes 15 via transverse tubes 16. This ensures that no vaporized heat transfer medium can flow into the heat transfer medium feed pipes 18. Furthermore, this also ensures that all of the heat transfer medium flows through the heat transfer medium distributors 11 into the heat exchanger tubes 15. In this way, a uniform temperature distribution and heat transfer medium distribution is achieved in the heat exchanger 9. In the embodiment shown here, it can be seen that all heat exchanger tubes 15 are connected to one another by the transverse tubes 16.

Corresponding to the cross sections shown in FIGS. 2 and 3, a gas-permeable plate 17 configured as a screen can also be seen in the embodiment shown here.

LIST OF REFERENCE NUMERALS 1 reactor
2 fluidized bed
3 windbox
4 gas distributor
5 disengagement zone
6 solids precipitator
7 introduction of gas
8 product discharge
9 heat exchanger
10 heat transfer medium inlet
11 heat transfer medium distributor
12 heat transfer medium collector
13 vapor collector
14 vapor offtake
15 heat exchanger tubes
16 transverse tubes
17 gas-permeable plates
18 heat transfer medium feed pipe

19 inflow direction of the heat transfer medium
20 flow direction of the heat transfer medium
21 reactor wall
22 direction of heat transfer medium discharge

The invention claimed is:

1. A reactor for preparing chlorine from hydrogen chloride by gas-phase oxidation with oxygen in the presence of a heterogeneous catalyst comprising a fluidized bed, with gas-permeable plates being located in the fluidized bed transverse to the flow direction of gas through the fluidized bed, wherein the gas-permeable plates are connected in a thermally conductive manner to a heat exchanger located in the fluidized bed, wherein the heat exchanger has tubes which run horizontally in the fluidized bed and are connected to the gas-permeable plates, wherein the thermal conductivity of the gas-permeable plates is greater than the thermal conductivity of the fluidized bed, and wherein the gas-permeable plates rest on the horizontal tubes or the horizontal tubes are integrated into the gas-permeable plates.

2. A reactor according to claim 1, wherein the horizontal tubes connect vertical heat exchanger tubes of a shell-and-tube heat exchanger.

3. A reactor according to claim 1, wherein the gas-permeable plates connect vertical plates of a plate heat exchanger to one another.

4. A reactor according to claim 1, wherein channels or tubes through which a heat transfer medium flows run through the gas-permeable plates.

5. A reactor according to claim 1, wherein perforated plates are used as gas-permeable plates.

6. A reactor according claim 1, wherein ordered or unordered mesh structures are used as gas-permeable plates.

7. A reactor according to claim 1, which additionally comprises a windbox and a gas distributor adapted for introducing hydrogen chloride and oxygen into the fluidized bed.

8. A reactor according to claim 7, wherein at least one perforated plate is used as gas distributor.

9. A reactor according to claim 7, wherein at least one plate provided with gas distributor nozzles is used as gas distributor.

10. A reactor according to claim 7, wherein an impingement device is located in the windbox above a gas inflow opening.

11. A reactor according to claim 10, wherein the impingement device is a flat, round-domed or funnel-shaped metal sheet arranged transverse to the inflow direction.

12. A reactor according to claim 1, wherein a granular fluidized-bed material comprising the heterogeneous catalyst is used to form the fluidized bed.

13. A reactor according to claim 7, wherein the interior walls of the reactor, gas-permeable plates, heat exchanger surfaces, interior walls of the windbox and the gas distributor are made of steel or nickel alloys.

14. A reactor according to claim 7, wherein the gas distributor is made of a ceramic material.

15. A process for preparing chlorine from hydrogen chloride by gas-phase oxidation with oxygen comprising feeding hydrogen chloride and oxygen to a reactor, carrying out said gas-phase oxidation in the reactor, and removing chlorine from the reactor, wherein the reactor is a reactor according to claim 1.

16. A reactor according to claim 1, wherein the interior walls of the reactor, gas-permeable plates, and heat exchanger surfaces are made of steel or nickel alloys.

17. A reactor according to claim 1, wherein the gas-permeable plates have individual openings in the range of 10 to 1000 mm$^2$.

18. A reactor according to claim 1, wherein the gas-permeable plates have a spacing of from 20 to 50 cm.

* * * * *